United States Patent [19]

Vendramini

[11] 4,081,618
[45] Mar. 28, 1978

[54] AUTOMATIC TELEPHONE DIALLING APPARATUS

[76] Inventor: Dante Vendramini, 17, Rue Jean Dussourd, 92600 Asnieres, France

[21] Appl. No.: 722,993

[22] Filed: Sep. 13, 1976

Related U.S. Application Data

[63] Continuation of Ser. No. 566,762, Apr. 10, 1975, abandoned.

[51] Int. Cl.² .............................................. H04M 1/48
[52] U.S. Cl. .................................................. 179/90 CS
[58] Field of Search ........... 179/90 CS, 90 R, 6.3 CC; 235/61.11 R, 61.11 A, 61.11 B, 61.12 R

[56] References Cited

U.S. PATENT DOCUMENTS

| | | | |
|---|---|---|---|
| 3,124,659 | 3/1964 | Andregg et al. | 179/90 CS |
| 3,129,294 | 4/1964 | Henatsch | 179/90 CS |

*Primary Examiner*—Kathleen Claffy
*Assistant Examiner*—Gerald L. Brigance
*Attorney, Agent, or Firm*—Morse, Altman, Oates & Bello

[57] ABSTRACT

Apparatus for automatically dialling telephone numbers and a card indicative of the number to be called, in which the card is provided with three tracks. The first track is a continuous rectilinear sawtooth track and the second track is parallel thereto and has formed therein cavities, the length of which are indicative of the number to be called. The third track is associated with the second track and is used to stop the card at a particular point. In the apparatus, feelers are provided to co-operate with each track and the card is pushed into the apparatus by a user and will return at a uniform speed. A first feeler can co-operate with the first track to produce a train of impulses only when a second feeler engages in a cavity of the second track, so that the length of the train of impulses is determined by the length of a cavity of the second track. These cavity lengths are indication of the number to be called. The stop provided by the third track and feeler can be used so that the card is stopped until a tone is heard in the earpiece whereupon the user can restart the return movement of the card.

16 Claims, 11 Drawing Figures

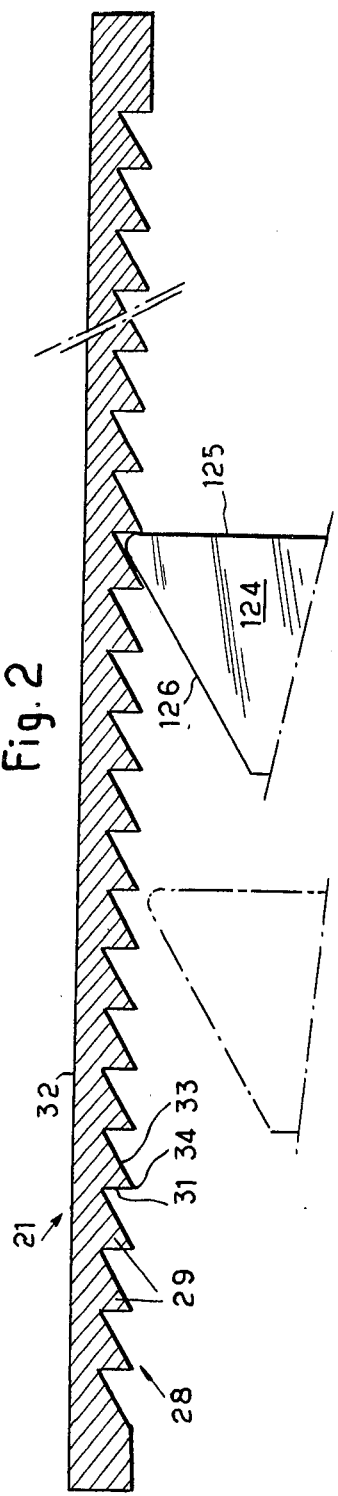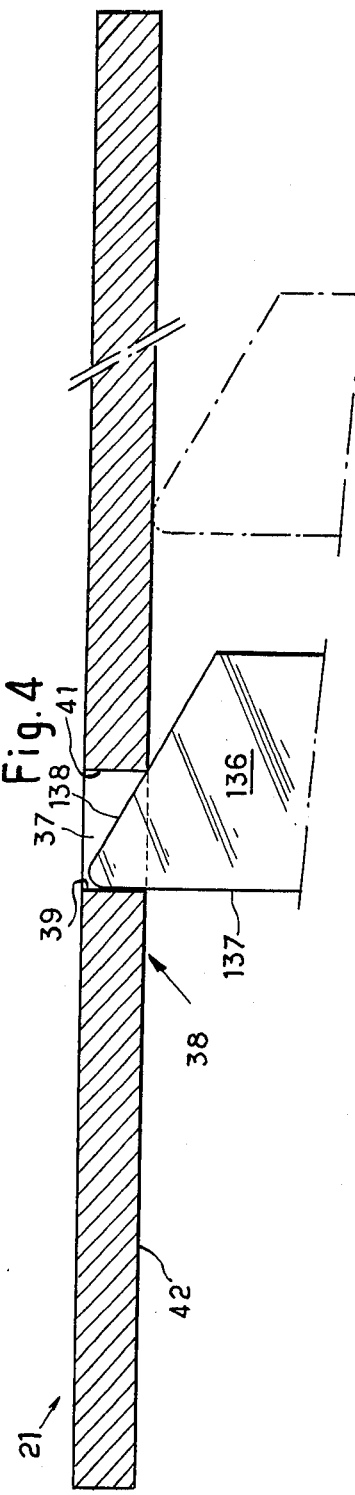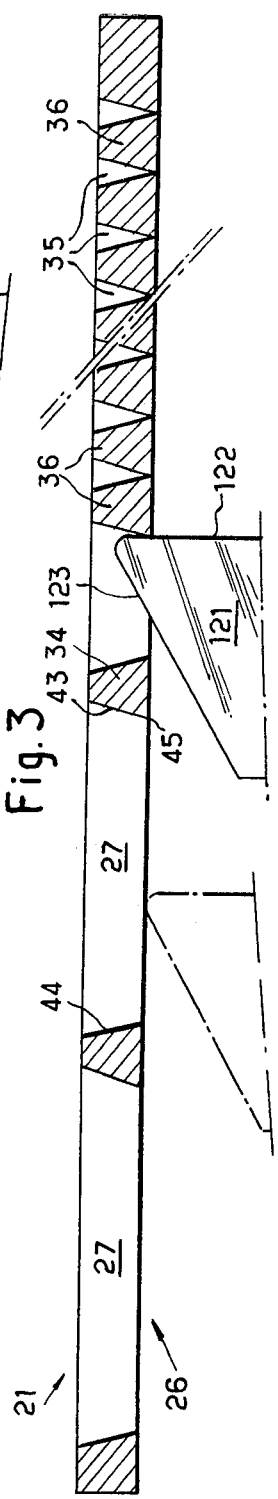

AUTOMATIC TELEPHONE DIALLING APPARATUS

This is a continuation of application Ser. No. 566,762 filed on Apr. 10, 1975 now abandoned.

The invention relates to automatic telephone dialling apparatus and to a support characteristic of the telephone number for use with such apparatus.

It has already been proposed to provide for use with the dial of a telephone apparatus intended to call a correspondent of which one knows the telephone number, this being done by introducing a card characteristic of the number into the apparatus.

The apparatuses of the known type up till now are of a relatively complicated construction and the operation of them has not been without difficulties, certain types of the apparatus making use of memories.

The information carried on the card and corresponding to the number to be called is often expressed in a binary system, rendering difficult the fabrication of a card for the user. The obtaining of the undesired number when the card is not utilised exactly in the requried manner is not unusual.

According to the invention, there is provided apparatus for the automatic dialling of a telephone number, said apparatus comprising a frame, an aperture in said frame for the introduction of a support carrying in code the figures of the number to be dialled, means for moving said support at a constant velocity relative to said frame, a first feeler cooperable with a continuous first track on said support, to produce a train of impulses and a second feeler cooperable with a second track of said support, said second track being characteristic of the number to be dialled, the cooperation between the first feeler and the first track being controlled by the second feeler.

The apparatus according to the invention can be of a simple construction and sure functioning.

Preferably, the first track is of saw tooth form of a rack, and the second is constituted by a succession of changes in level or of ledges of which the lengths are characteristic respectively of the successive figures of the number to be called. In one embodiment of the apparatus according to the invention, each of the feelers forms part of a lever and the levers are maintained in the inoperative position as long as the card or analogous piece is not fed into its maximum enforcement position, the return movement of which is caused by the action of a spring put under tension during the course of forward movement; one thus avoids the calling of false numbers which results from insufficient enforcement of the card.

According to the invention, equally, means are provided for, in the course of the operating movement of a card, stopping the latter as a function of information which it carries. One can thus utilize the card to call telephone numbers in a province or a foreign country, where it is required, during the course of a call, to await the arrival of the tone after the sending of some of the figures.

A card used in apparatus according to the invention can comprise, therefore, as well as the first and second tracks, a third track for the control of the said stopping, or a lateral extension of the second track, and on the apparatus, one can provide means to render inoperative by a manual actuation the card stopping means.

A card can comprise several groups of tracks corresponding to several numbers to be called.

The tracks can be carried by an object other than a card, for example a square cross-section rod of which each of the faces is provided with a number.

In order that the invention will more readily be understood, the following description is given by way of example, reference being made to the accompanying drawings, in which:

FIG. 2 is a view on a larger scale, in section, along the line 2—2 of FIG. 1;

FIG. 3 is a section along the line 3—3 of FIG. 1;

FIG. 4 is a section along the line 4—4 of FIG. 1;

Figure 1:
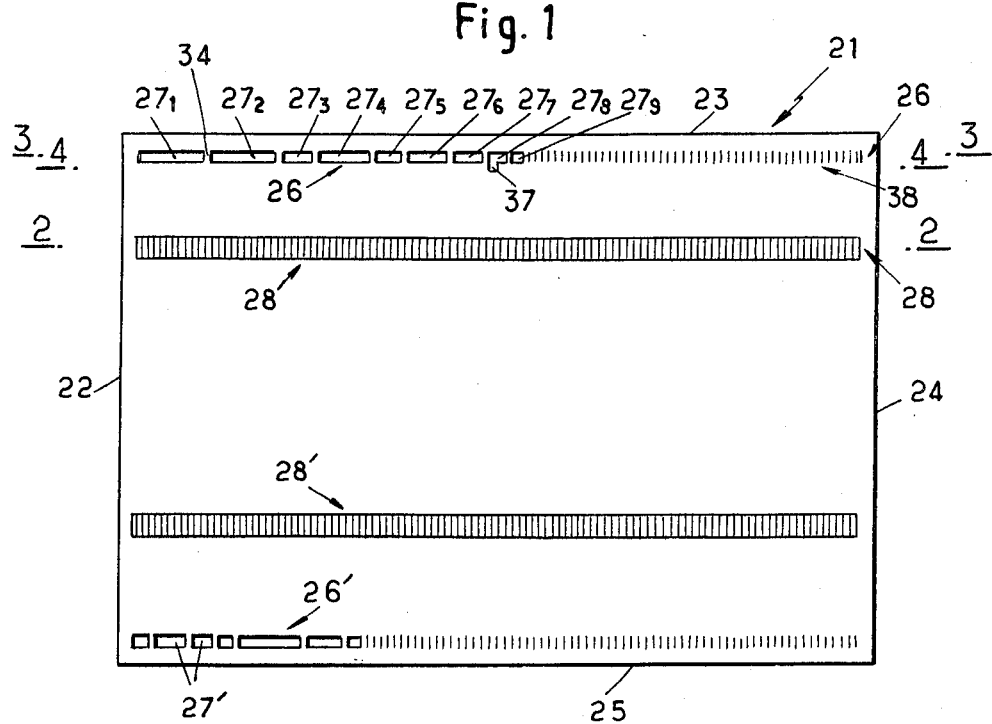
FIG. 1 is a schematic view from the upper face, of a card according to the invention, which is supposedly transparent.

A card 21 (FIG. 1) of a generally rectangular form has edges referenced 22, 23, 24, 25 carried close to one of the longitudinal edges, 23 for example, a straight track 26 constituted by a succession of small rectangular cavities $27_1$, $27_2$, etc. It comprises, adjacent to the first track, and parallel thereto, a second rectilinear track 28. The track 28 is constituted by a succession of teeth 29 (FIG. 2) of which each is limited by an edge 31 perpendicular to the upper face 32 of the card 21 and by an oblique edge 33 which, starts from the stop 34, and approaches the upper face 32.

The cavities 27 of which the series constitutes the track 26 have lengths which are multiples of a unit length increased by one unit. The Example represented in FIG. 1 corresponds to a call number 1 2-4638400

The cavity $27_9$ corresponding to the figure "1" has thus a length $1 + 1 = 2$.

The cavity $27_8$ corresponding to a figure "2" has a length $2 + 1 = 3$ etc.

The cavity $27_3$ corresponding to the figure "4" has a length equal to 5.

The cavity $27_1$ and $27_2$ corresponding to a numeral 0 (10) each have a length equal to 11.

The various cavities are separated from one another by flats 34 by length equal to a unit of length.

FIG. 3 shows an embodiment of such a track. The card 21 is a plastics material, for example plexiglass, includes a succession of rectangular notches 35 connecting strips 36 having a trapezoidal section; by notching a certain number of connecting bars 36 one forms cavities 27 of the desired length separated by flats 34 of which each is constituted by a resting strip 36.

One of these cavities, the cavity $27_8$ in the example, is formed with a lateral enlargement as shown at 37. This enlargement can be considered as constituting a third track 38. The edges 39 and 41 of the enlargement 37 parallel to the faces 22 and 24 are perpendicular to the upper face 32 and the lower face 42 of the plate or card 21 when the edges 43 and 44 of the cavities 27 are slightly oblique with respect to the said faces.

In the embodiment shown in FIG. 1, the card or plate 21 has, near its edge 25 opposite the edge 23, a second track 26' having a cavity 27', and a second track 28' identical to the track 28.

The stops 45 joining the edges 43 with the lower face 42 are aligned with the edges 31.

The edge 39 of the cavity 37 is equally aligned with an edge 31 of the tooth 29 of the track 28.

Figure 5:
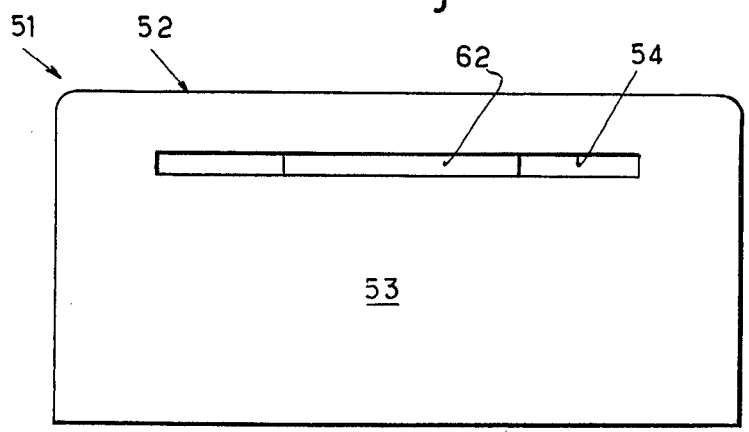
FIG. 5 is a view of an apparatus from the front face.

The card or plate 21 is intended to cooperate with a telephone number call apparatus 51, which comprises a box 52 (FIG. 5) of a generally rectangular parallelepipedonal form on the front face 53 of which is provided a slot 54 provided for the introduction of a card 21.

In front of the front wall 53, slightly above the level of the slot 54 a shaft 55 (FIG. 6) is mounted for rotation about its axis between two flanges 56 and 57 parallel to the longitudinal walls 58, 59 of the box 52. Facing the slot 54 is found a flat surface 61 (FIG. 7) designed to receive the end of a card 21 and which is formed on a carriage 62 which is mounted to slide the length of two longitudinal rails 63, 64 fixed between two flanges 65 and 66 parallel and adjacent respectively to the face or to the rear wall 67 and to the front wall 53 of the box 52. The tongue 61' assists in maintaining the end of the card.

The rails 63 and 64, having a circular section, also serve to guide a U-shaped piece 68 of which a branch 69 provided with perforations 71 and 72 for the passage of the rails 63 and 64 respectively, and of which the other branch 73 has likewise perforations 74 and 75 for the passage of said rails.

The U-shaped piece 68 is formed from a plate and its body 76 joining the branches 69 of 73 to a lower edge 77 which, starting from a straight path from the branch 69 presents a shoulder 78 followed by a part 79 parallel to the upper edge 81 but further from the latter than the edge 77. The part 79 extends itself by an oblique part or ramp 82, which is followed by a straight part 83 aligned with the part 77.

Figure 8:
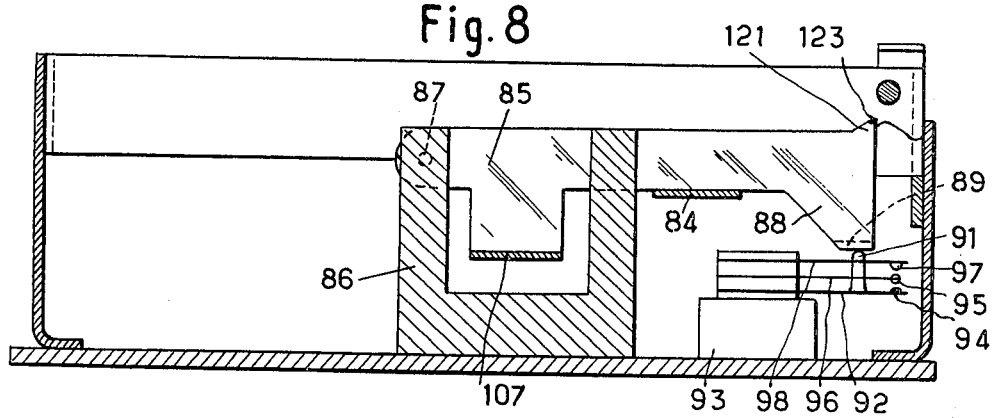
FIG. 8 is a section taken along the line 8—8 of FIG. 6.

The part 79 and the ramp 82 are designed to cooperate with a first tab portion 84 formed on a first lever 85 (FIG. 8) mounted, at its rear end, on an upright 86 forming part of the frame of the apparatus for rotation around an axis 87.

Figure 11:
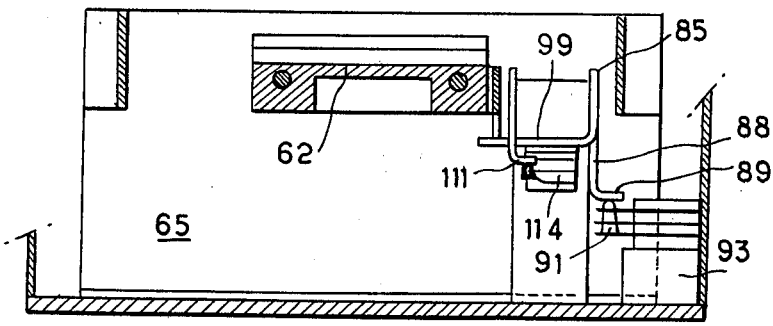
FIG. 11 is a section taken along the line 11—11 of FIG. 6.

The front leg 88 of the lever 85 forms a second tab 89 (FIG. 11) designed to cooperate with a protuberance 91 carried by a resilient reed 92 fixed to its attachment by a stud 93. The free end of the reed 92 has a contact 94 arranged to cooperate with a facing contact 95 which is carried on a reed 96 equally fixed on the stud 93. The contact 95 is double faced and its face opposite the contact 94 can operate with a contact 97 carried at the end of a reed 98.

Figure 9:
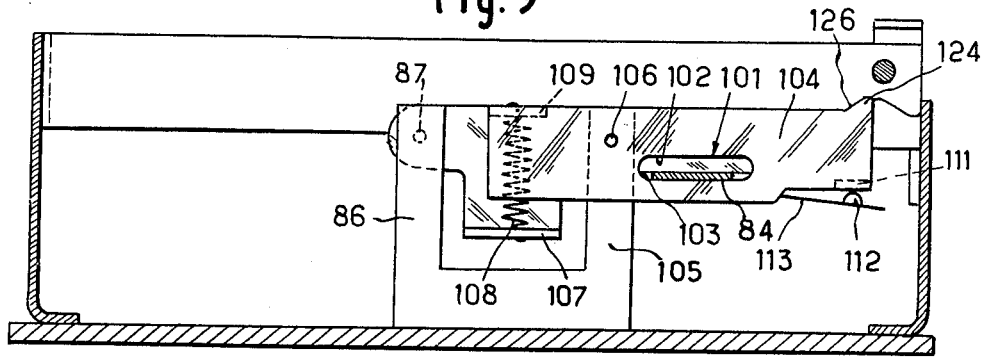
FIG. 9 is a section taken along the line 9—9 of FIG. 6.

The tab passes through an elongate hole 101 (FIG. 9) having longitudinal faces 102 and 103 which contact a second lever 104 mounted at an intermediary point on its length on a second upright 105, forming part of the frame, and rotatable around a shaft 106.

The lever 85 has a third tab portion 107, close to its point of rotation about the axis 87 and the tab 107 is fastened to a spring 108 the other end of which is fastened to a tab 109 of the second lever 104.

The latter has a second tab 111 intended to cooperate with a contact plate 112 carried at the end of the resilient reed 113 of which the other end is fixed to a stud 114 depending from the lever 85.

At its front end, the lever 85 has a feeler finger 121 of which the front end 122 (FIG. 3) is vertical and the edge of the end 123 makes with the edges 122 an angle a little less than 90°.

Similarly the lever 104 has, at its front end, a feeler 124 of which the front edge 125 (FIG. 2) is vertical and the end edge 126 is directed obliquely with respect to the edge 125.

Figure 10:
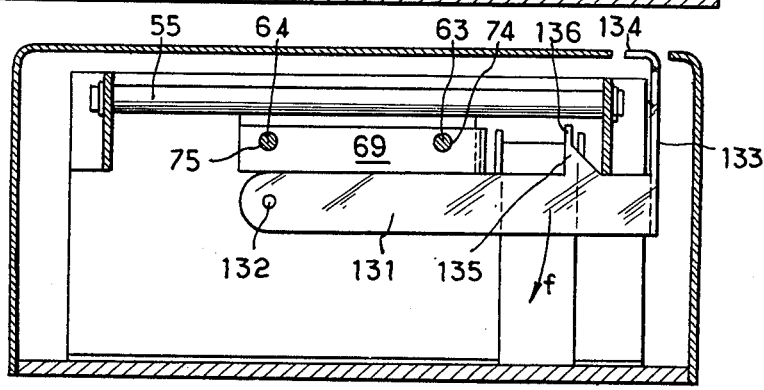
FIG. 10 is a section taken along the line 10—10 of FIG. 6.

The third lever 131 (FIG. 10) is mounted by one of its ends to rotate around a longitudinal axis 132. A branch 133 of the said lever is terminated by a button or other operable member 134 accessible from the exterior of the box and which permits pivoting of said lever about its axis 132 in the sense of the arrow F against the action of resilient means not shown. The lever 131 has an additional part 135 ending in a lever 136 of which the lever 137 (FIG. 4) is vertical and the end edge 138 is oblique with respect to the said edge 137 forming therewith an angle which is somewhat less than 90°.

The studs 93 and 114 are connected electrically to call circuits of a combined telephonic set.

The resilient means, for example contained in the box 141, are put under tension by means of a cable during the advance movement of the carriage in the direction of the arrow $f_1$. They are designed to provoke or produce the return of the carriage in the sense of the arrow $f_2$. Means are provided to ensure a return movement at the uniform speed. One can, for example, apply for this effect means utilised to return at a uniform speed the dial of the telephone apparatus connecting the carriage to a shaft of such a device by a bolt-nut system.

The operation is as follows:

When one desires to call a telephone number, one chooses a card or plate which has been provided to call this number. If, for example, one wishes to call 12-4638400, one chooses the card 21 shown in FIG. 1 and one introduces it into the slot 54 by presenting it such that its face 32 should be turned towards the top. The edge 22 of the card 21 comes into contact with the shoulder 62' of the carriage 62 and is maintained by the tongue 61'. In pushing the card, the carriage 62 is caused to move against the action of the resilient means contained in a drum 141. The U-shaped piece 68 is then in the position shown in FIG. 6 with its branch 69 spaced from the flange 65. The tab 84 of the piece 85 is maintained in its bottom position by co-operation with the part 79 of the box 76 of the U-shaped piece, such that the feeler 121 is in its withdrawn position, that is to say spaced from the lower face 42 of the plate 21.

By co-operation with the longitudinal lower edge 103 of the longitudinal hole 101, second lever 104 is equally maintained in its condition for which the feeler 124 which it carries is withdrawn, that is to say spaced from the lower face 42 of the card 21.

The feeler 136 is equally maintained in its lower position by co-operation with the upper edge of the feeler 131 which it carries with the lower face of the lever 104, itself maintained in the lower position.

To maintain it in the low position of the first lever 85, the second tab 89, for co-operation with the projection 91 maintains open the circuits controlled by the contacts 94, 95 and 97.

In this condition, the tab 111 of lever 104 co-operates with the contact 112.

During this phase of introduction of the card, no impulse current is sent in the circuit. If, at any moment, before the introduction is complete, the user leaves the card it is returned by the fact that the resilient means contained in the drum 141 and put under tension during the introduction phase in which made the carriage move back: no impulse of current is sent to the circuit during the return movement.

At the end of the movement of the carriage 62, that is when the introduction of the card is complete, the lower face 60 of the carriage 62 co-operates with the branch 69 of the U-shaped piece 68. This latter is displaced longitudinally, on a length however relatively very small until it abuts the branch 69 against the flange 65. By the longitudinal displacement of the body 76 of the U-shaped piece 68 the edge 79 slides in front of the tab 84 until it escapes from the latter and, under the action of the resilient means, as shown by a spring, the first lever 85 pivots about its axis 87. The feeler 121 is thus put in its operative condition. The pivoting of the first lever 85 connects a second lever 104 pivoted about its axis 106 under the action of a spring 108 and a second feeler 124 is thus equally put in its operative position.

The lever 131 thus pivots about its longitudinal axis 132 and a third finger 136 is put in its operative position.

In this condition, the feelers 121, 124 and 136 are urged in resiliently against the lower face 42 of the card.

During the return movement of the latter, at a uniform speed, the track 26 slides in front of the feeler 121, the track 28 slides in front of the feeler 124 and the track 38 slides in front of the feeler 136.

During the time the feeler 121 is not contacted by a cavity 27, it is in the position shown in dot dash lines in FIG. 3. In this position, the co-operation of the tab 84 on the first lever 85 with the lower edge 103 of the elongate hole 101 of the lever 104 maintains the feeler 124 spaced from the track 28 which is in the condition shown in dot dash lines in FIG. 2. In these conditions, the contact 112 rests applied against the tab 111 and no impulse is sent to the circuit. However, as soon as the tab 84 has escaped from the edge 79, the tab 89 is spaced from the projection 91 and the contact 94 is applied on the contact 95 which is applied in its turn on the contact 97 putting the telephone set in the condition which is that when one manoeuvres the habitual dial in the sense of the hands of a watch.

When, during the course of the return movement of the plate or the card 21, the cavity 27 is presented in front of the feeler 121, the latter penetrates into it under the action of the spring, by a complementary pivoting movement of the first lever 85. By its pivoting, the second lever 104 is freed in a sufficient manner for its feeler 124 to be able, under the action of the spring 108 to co-operate with the track 28. The sawtooth shape of the teeth of the track constituted by the succession of teeth 29 causes the feeler 124 to vibrate and in consequence oscillates the lever 104 and the co-operation of the tab 111 of the lever 104 with the contact 112 carried by the resilient reed 113 causes a train of impulses in the telephone line. This train of impulses is continued as long as the feeler 121 is located in the cavity 27. The number of impulses depends on the length of the cavity 27 which slides in front of the feeler 121. The rear edge 44 of the said cavity co-operating with the end edge 123 of the feeler 121 returns the latter to its withdrawal position and that during the sliding of a single prismatic connecting piece 34.

For this position of the feeler 121, the feeler 124 is again spaced from the track 28 and the train of impulses ceases.

As soon as the following cavity 27 slides in front of the feeler 121, the latter penetrates into the cavity and again the feeler 124 co-operates with the track 28, this engendering impulses of which the number depends on the length of the said cavity.

As long as the cavity 27 does not have a widening the feeler 136 co-operates with the lower face 42 of the card 21 as shown in dot dash lines in FIG. 4.

As soon as a widening such as 37 is provided facing the feeler 136, the latter extends into the widening and its vertical edge 137 co-operates with the edge 39 of the widening interrupting the movement of the card. The latter remains immobilised as long as a user does not act on the button 134.

When a user acts on the button 134, for example on hearing the required tone in the earpiece the movement of the card continues and the other figures constituting the number are sent in the line in the form of normal impulses.

Such an immobilisation of the card can equally be provided to maintain the latter in the interior of the device or apparatus to maintain the card in the operative position, for example, after noting that the number asked for is engaged. It suffices, therefore, to effect a new call, to press on the button 134 which frees the card.

Figure 6:
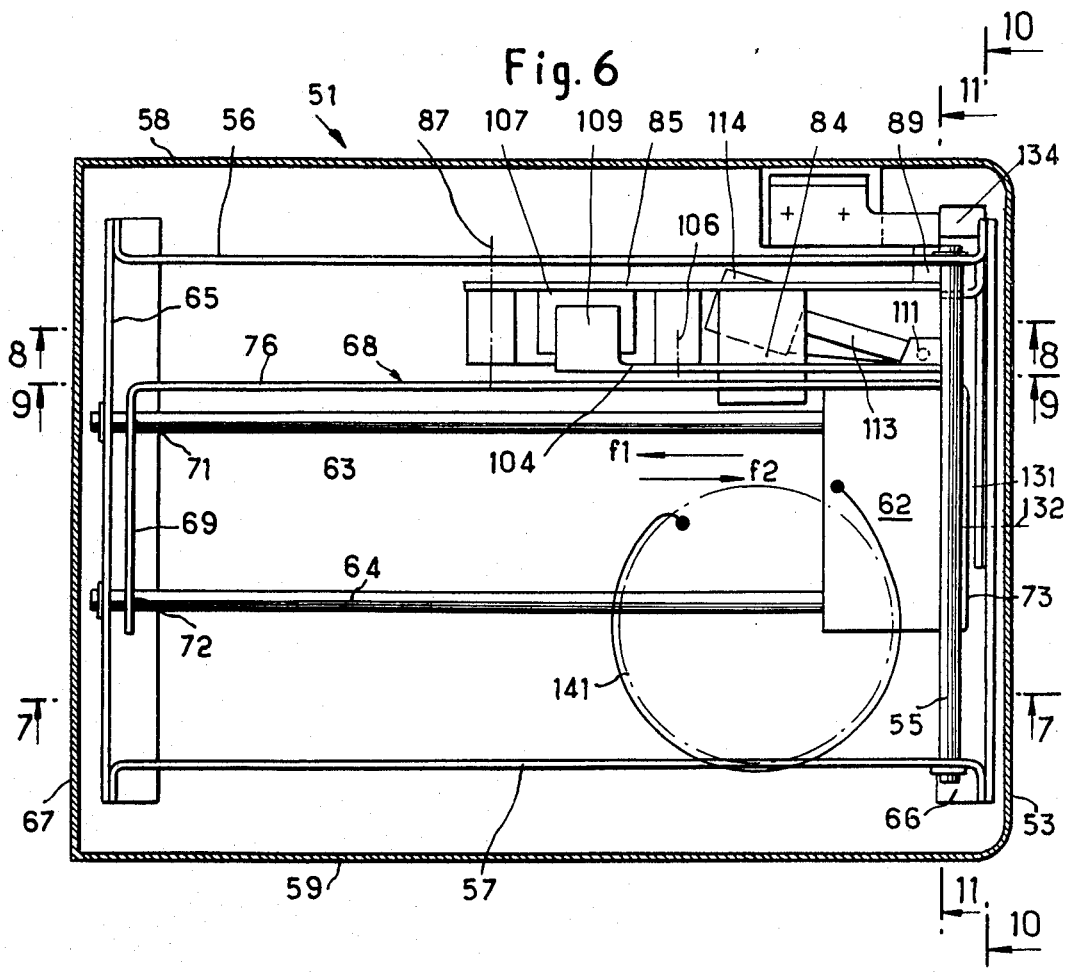
FIG. 6 is a plan view of the said apparatus, the upper wall being supposedly lifted.
Figure 7:
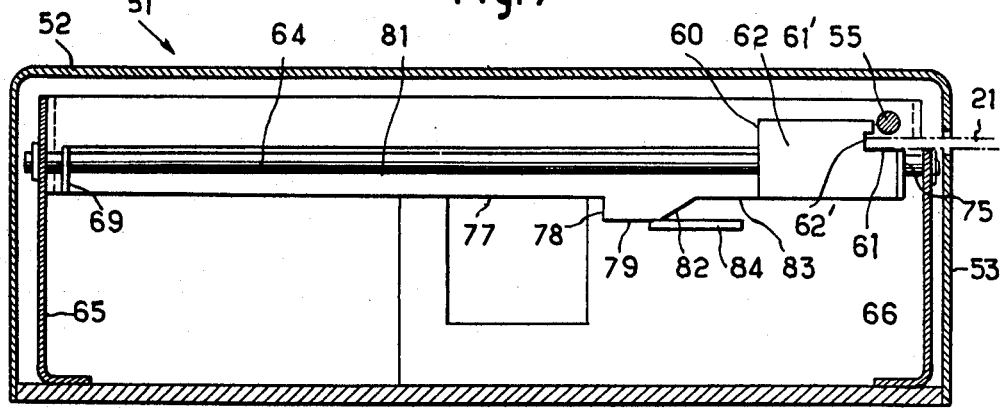
FIG. 7 is a section along the line 7—7 of FIG. 6.

At the end of the return movement, the carriage 62 begins to press by its lower face the branch 73 of the U-shaped piece 68, and the latter returns to the position shown in FIG. 6 and 7 the co-operation of the ramp 82 with the tab 84 returns the first lever 85 to the lower position and the said tab, by co-operation with the lower face 103 of the elongate hole 101, returns the lever 104 also to its lower position.

One returns therefore to the initial condition.

The apparatus is again ready to obtain automatically a telephone number by the introduction of a card.

I claim:

1. Apparatus for the automatic dialling of a telephone number, said apparatus comprising a frame, an aperture in said frame for the introduction of a support carrying in code the figures of the number to be dialled, means for moving said support at a constant velocity relative to said frame, a first feeler co-operable with a continuous first track on said support, effective to produce a train of impulses, and a second feeler co-operable with a second track of said support, said second track being characteristic of the number to be dialled, the cooperation between the first feeler and the first track being controlled by the second feeler, and means for stopping said support at a predetermined position, said means for stopping said support comprising a locking lever co-operable with a third track on said support.

2. Apparatus according to claim 1, and further comprising manually operable means to override said stopping means.

3. A card for use in an automatic telephone dialling apparatus comprising a card body, means defining a first rectilinear continuous track in said body for the generation of impulses, and co-operable with a first feeler in the apparatus, means defining a second rectilinear track in said body parallel to the first track and discontinuous as a function of the number to be called, said second track being co-operable with a second feeler which controls the operation of said first feeler, aid second track comprising a succession of aligned rectilinear cavities, of which each has a length which corresponds to a figure of the number to be called, said successive cavities being separated by flats of the same length, and further comprising a third track co-operable with a third feeler effected to stop said card.

4. A card as claimed in claim 3 wherein the said flat length is a unit length and the length of said cavities is in multiples of said unit length.

5. A card as claimed in claim 3, and further comprising a third track co-operable with a third feeler effective to stop said card.

6. A card as claimed in claim 3, wherein said third track comprises a cavity forming a lateral extension of at least one of the cavities of said second track.

7. Apparatus for the automatic dialling of a telephone number by means of a coded card, comprising a frame, said frame being formed with an aperture for the introduction of a card, said card including at least one pair of straight tracks carrying in code the figures of the number to be dialled and comprising a first track defined by a succession of small rectangular cavities formed in said card and a second track having a sawtooth configuration, each tooth thereof having the same pitch, means for moving said card at a constant velocity relative to the frame, a first feeler mounted to said frame co-operable with said first track of said card, and a second feeler mounted to said frame co-operable with said second track of said card, means to produce a train of impulses at a rate controlled by said second feeler as said first feeler is received by a cavity, and means for stopping said card at a predetermined position, said means for stopping the card comprising a locking lever co-operable with a third track on the card.

8. Apparatus, according to claim 7, wherein the cavities of the first track have lengths which are multiples of a predetermined unit length increased by one unit of length, the cavities being separated by flat portions, the length of which is a unit length.

9. Apparatus, according to claim 7, including a first lever carrying said first feeler and a second lever carrying said second feeler and means mounted on said first lever for controlling said second lever, said means for moving the support at constant velocity comprising a carriage which is longitudinally displaceable during the introduction of said card and carries means to unlock said levers from an inoperative position at the end of the carriage movement.

10. Apparatus, according to claim 7, wherein the freeing of a second lever by the arrival of the carriage at the end of its path of movement closes a circuit to a telephone line to allow transmission of said impulses on said line.

11. Apparatus, according to claim 10, including manually operable means to override said stopping means.

12. Apparatus, according to claim 10, wherein said third track comprises a cavity forming a lateral extension of at least one of the cavities of the second track.

13. A card for automatically dialling a telephone number by introduction of the card into a box, said card including a flat rectangular support formed with large parallel surfaces, a first track on said support consisting of a series of transverse perforations in line, the lengths of which perforations are characteristic of the digits of a telephone number, a second track parallel to the first track consisting of a series of teeth of a rack arranged by the command of electrical pulses of the telephonic transmission of the calling number by cooperation of a sensor, the extremities of the perforations of the first track being aligned with the extremities of the teeth of the rack.

14. A card, according to claim 13, in which the perforations are rectangular, the length of the long side characterizing a calling number or letter.

15. A card, according to claim 14, in which a rectangular perforation is formed with an enlarged transverse portion.

16. Apparatus for the transmission of electrical pulses corresponding to a telephone number coded in a track carried by a card inserted inside the apparatus, said telephone number being of the type where a first group of digits must first be dialed, followed by a pause until a telephone line signal is sent to the caller, a second group of digits being then dialed, said track comprising a first portion representative of said first group of digits, a second portion, and a third portion representative of said second group of digits, said apparatus comprising:
  (a) track sensing means for sensing the track carried by the card,
  (b) moving means for moving said card with respect to said sensing means,
  (c) stop means responsive to said second portion for interrupting the motion of the card, and
  (d) manual means for overriding said stop means.

* * * * *